(12) United States Patent
Nikula et al.

(10) Patent No.: US 8,615,132 B2
(45) Date of Patent: Dec. 24, 2013

(54) DEVICE AND METHOD FOR PROCESSING DIGITAL IMAGES CAPTURED BY A BINARY IMAGE SENSOR

(75) Inventors: Jarmo Antero Nikula, Jaali (FI); Samu Tapani Koskinen, Tampere (FI); Tero Pekka Rissa, Siivikkala (FI)

(73) Assignee: Nokia Corporation, Espoo (FI)

( * ) Notice: Subject to any disclaimer, the term of this patent is extended or adjusted under 35 U.S.C. 154(b) by 547 days.

(21) Appl. No.: 12/823,065

(22) Filed: Jun. 24, 2010

(65) Prior Publication Data

US 2010/0329566 A1 Dec. 30, 2010

Related U.S. Application Data

(60) Provisional application No. 61/219,819, filed on Jun. 24, 2009.

(51) Int. Cl.
*G06K 9/46* (2006.01)
*G06K 9/00* (2006.01)

(52) U.S. Cl.
USPC .......................................................... 382/190

(58) Field of Classification Search
USPC ......... 382/162, 164, 165, 168, 172, 173, 190; 345/501, 536, 561, 690; 358/3.08; 348/273, E5.091
See application file for complete search history.

(56) References Cited

U.S. PATENT DOCUMENTS

| | | | | |
|---|---|---|---|---|
| 4,903,142 A | * | 2/1990 | Hasebe et al. | 358/3.08 |
| 5,018,078 A | * | 5/1991 | Urabe et al. | 345/561 |
| 5,086,497 A | * | 2/1992 | Horikawa et al. | 715/209 |
| 5,335,082 A | * | 8/1994 | Sable | 347/232 |
| 5,768,412 A | * | 6/1998 | Mitsuyama et al. | 382/173 |
| 6,304,605 B1 | | 10/2001 | Haikonen et al. | 375/240.24 |
| 2007/0097450 A1 | | 5/2007 | Yamamoto | 358/426.01 |
| 2010/0177115 A1 | * | 7/2010 | Schweid | 345/596 |
| 2010/0328504 A1 | * | 12/2010 | Nikula et al. | 348/273 |
| 2010/0329566 A1 | * | 12/2010 | Nikula et al. | 382/190 |
| 2012/0200610 A1 | * | 8/2012 | Sakamoto et al. | 345/690 |

FOREIGN PATENT DOCUMENTS

| CN | 1836447 A | 9/2006 |
|---|---|---|
| CN | 101203884 A | 6/2008 |

OTHER PUBLICATIONS

Fossum, "Gigapixel Digital Film Sensor (DFS) Proposal", Nanospace Manipulation of Photons and Electrons for Nanovision Systems, The 7th Takayanagi Kenjiro Memorial Symposium and the 2nd International Symposium on Nanovision Science, University of Shizuoka, Hamamatsu, Japan, Oct. 25-26, 2005.

* cited by examiner

*Primary Examiner* — Amir Alavi
(74) *Attorney, Agent, or Firm* — Harrington & Smith

(57) ABSTRACT

A method for processing image data comprises determining a set of parameters based on a binary digital image) such that said set of parameters comprises information about the density of white and/or black pixels of a first group of pixels of said binary digital image), and information about the density of white and/or black pixels of a second group of pixels of said binary digital image.

13 Claims, 13 Drawing Sheets

DEVICE AND METHOD FOR PROCESSING DIGITAL IMAGES CAPTURED BY A BINARY IMAGE SENSOR

This application claims benefit of 61/219,819 filed on Jun. 24, 2009.

FIELD OF THE INVENTION

The present invention relates to processing digital images.

BACKGROUND

A binary image sensor may comprise e.g. more than $10^9$ individual light detectors arranged as a two-dimensional array. Each individual light detector has only two possible states: an unexposed "black" state and an exposed "white" state. Thus, an individual detector does not reproduce different shades of grey.

The size of the individual light detectors of a binary image sensor may be smaller than the minimum size of a focal spot which can be provided by the imaging optics of a digital camera. The use of such detectors may help to avoid e.g. color aliasing problems due to color filter arrays.

However, storing or transferring binary digital images as such may be difficult or impossible due to the large data size. Several exposures and read-outs may be needed to attain a sufficient signal-to-noise ratio. The resulting image data may even be so large that storing and processing of the binary digital images becomes impractical in a digital camera, or even in a desktop computer.

SUMMARY

An object of the invention is to provide an image processing device. An object of the invention is also to provide a method for processing an image.

According to a first aspect of the invention, there is provided a method for processing image data, said method comprising determining a set of parameters based on a binary digital image such that said set of parameters comprises information about the density of white and/or black pixels of a first group of pixels of said binary digital image, and information about the density of white and/or black pixels of a second group of pixels of said binary digital image According to a second aspect of the invention, there is provided a method for generating a digital image, said method comprising determining spatially non-uniform image elements by using a set of parameters, wherein said set of parameters comprises information about the relative density of white and/or black pixels of a first group of pixels of said binary digital image, and information about the relative density of white and/or black pixels of a second group of pixels of said binary digital image.

According to a third aspect of the invention, there is provided a computer readable medium comprising program code, which when executed by a data processor is for determining a set of parameters based on a binary digital image such that said set of parameters comprises information about the density of white and/or black pixels of a first group of pixels of said binary digital image, and information about the density of white and/or black pixels of a second group of pixels of said binary digital image.

According to a fourth aspect of the invention, there is provided a device comprising a signal processing unit arranged to determine a set of parameters based on a binary digital image such that said set of parameters comprise information about the density of white and/or black pixels of a first group of pixels of said binary digital image, and information about the density of white and/or black pixels of a second group of pixels of said binary digital image.

According to a fifth aspect of the invention, there is provided a device comprising a decoder arranged to generate a digital image by determining spatially non-uniform image elements by using a set of parameters, wherein said set of parameters comprises information about the relative density of white and/or black pixels within a first group of pixels of said binary digital image, and information about the relative density of white and/or black pixels within a second group of pixels of said binary digital image.

A binary digital image may be encoded into a set of parameters comprising information about the relative density of exposed pixels within a group of pixels of said binary digital image, and comprising information about the distribution of exposed pixels within a group of pixels of said binary digital image.

Consequently, the size of image data may be reduced e.g. by 94%. This facilitates storing, transferring, and/or processing of the image data.

The parameters may be subsequently encoded into an output image by selecting spatially non-uniform image elements from an image element array based on previously determined parameters.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION

Figure 1:
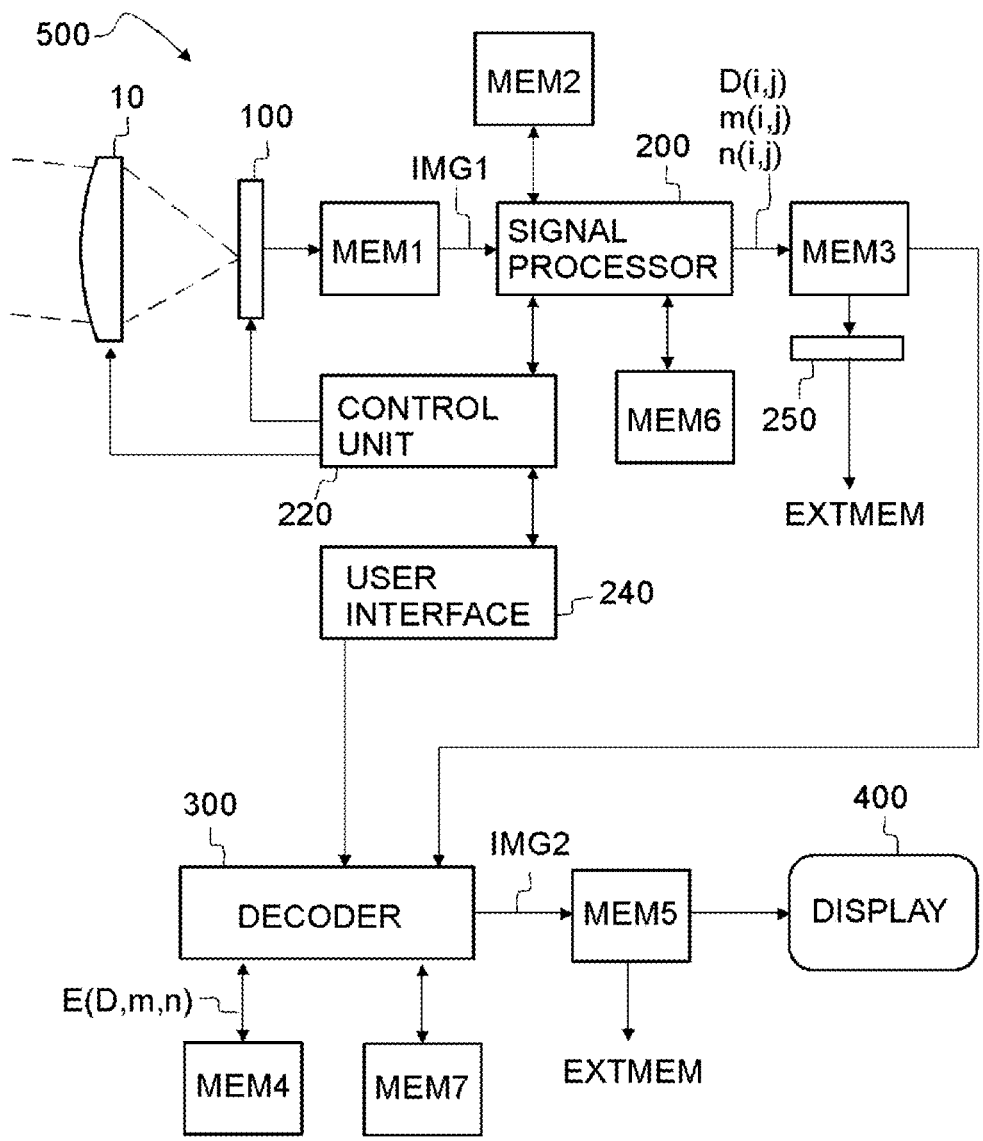
FIG. 1 shows an imaging device.

Referring to FIG. 1, an imaging device 500 may comprise imaging optics 10 and an image sensor 100 for capturing a binary digital input image IMG1 of an object. The device 500 may also be called as an "apparatus".

The device 500 may comprise a signal processing unit 200 for generating one or more parameter arrays DM1, MM1, NM,1 based on an input image IMG1 provided by the image sensor 100. The generation of the parameter arrays may be called as an encoding stage.

In an embodiment, the signal processing unit 200 may be arranged to provide a set of parameter arrays comprising density information D(i,j), and distribution information m(i,j), n(i,j).

The imaging device 500 may comprise a decoder 300 arranged to provide an output image IMG2 based on the density information and based on the distribution information. The generating an output image IMG2 from the density and distribution information may be called as a decoding stage.

The input image IMG1 may depict an object, e.g. a landscape, a human face, or an animal. The output image IMG2 may depict the same object but at a lower resolution.

The image sensor 100 may be binary image sensor comprising a two-dimensional array of light detectors. The detectors may be arranged e.g. in more than 10000 columns and in more than 10000 rows. The image sensor 100 may comprise e.g. more than $10^9$ individual light detectors. An input image IMG1 captured by the image sensor 100 may comprise pixels arranged e.g. in 41472 columns and 31104 rows. (image data size $1.3 \cdot 10^9$ bits).

The parameter arrays for generating a corresponding output image IMG2 may comprise e.g. a plurality of density values D(i,j), and distribution values m(i,j), n(i,j) arranged e.g. in 2592 columns and 1944 rows. Each density value D(i,j) may be expressed e.g. by using 8 bits, each distribution value m(i,j) may be expressed e.g. by using 4 bits, and each distribution value n(i,j) may be expressed e.g. by using 4 bits. Thus, the total data size of the parameter arrays may be equal to 2592×1944×(8 bits+4 bits+4 bits)=$8 \cdot 10^7$ bits. Thus, the data size may be reduced e.g. by a factor of 16 (=$1.3 \cdot 10^9 / 8 \cdot 10^7$).

The data size of a binary input image IMG1 may be e.g. greater than or equal to 4 times the total data size of the corresponding parameter arrays, wherein the data sizes may be indicated e.g. in the total number of bits needed to describe the image information. With greater data reduction, the data size of the input image IMG1 may be greater than 10 times, greater than 20 times or even greater than 50 times the data size of the corresponding parameter arrays.

The parameter arrays may be stored e.g. in a memory MEM3.

The imaging device 500 may further comprise a buffer memory MEM1 for storing input images IMG1. The input memory MEM1 may at least temporarily store at least a few rows or columns of the pixels P1 of the input image IMG1. Thus, the input memory may be arranged to store at least a part of the input image IMG1. The imaging device may comprise an operational memory MEM2 e.g. for storing data during image processing steps.

The element values of the parameter arrays may be sent via an interface 250 to one or more external devices (not shown).

The external device may be e.g. an external memory EXT-MEM. The information may be sent e.g. via internet and/or via a mobile telephone network.

The output image IMG2 may be stored in a memory MEM5.

The imaging device 500 may comprise a memory MEM4 for storing image element data E(D,m,n).

In an embodiment of the device 500, density information and distribution information contained in the parameter arrays may be converted into an output image IMG2 by using image elements E(D,m,n). This may be called as a decoding stage.

Instead of retrieving the image elements E from a memory, they may be calculated on-the-fly The imaging device 500 may further comprise a display 400 for displaying the output images IMG2. Also the input images IMG1 may be displayed. However, as the size of the input image IMG1 may be very large, it may be so that only a small portion of the input image IMG1 can be displayed at a time at full resolution.

If desired, the output image IMG2 may be sent to one or more external devices (not shown).

The user of the imaging device 500 may use an interface 240 e.g. for selecting image capturing mode, exposure time, optical zoom (i.e. optical magnification), digital zoom (i.e. cropping of digital image), and/or resolution of an output image IMG2.

The imaging device 500 may further comprise a control unit 220 for controlling the operation of the imaging device 500. The control unit 220 may be arranged to send signals to the image sensor 100 e.g. in order to set the exposure time, in order to start an exposure, and/or in order to reset the pixels of the image sensor 100.

The control unit 220 may be arranged to send signals to the imaging optics 10 e.g. for performing focusing, for optical zooming, and/or for adjusting optical aperture.

The decoder 300 may be a part of the signal processing unit 200. The decoder 300 may also be separate from the imaging device 500. The decoder 300 may also be implemented e.g. in a portable computer.

The imaging device 500 may further comprise a memory MEM6 and a memory MEM7 for storing computer program code in order to execute image processing operations, e.g. encoding, averaging and/or decoding. The memories MEM1, MEM2, MEM3, MEM4, MEM5, MEM6, and/or MEM7 may be separate or they may be memory areas implemented within a single physical component.

The imaging optics 10 may be e.g. a focusing lens.

Thanks to image processing according to the present invention, the output memory MEM3 and/or the external memory EXTMEM may store data for retrieving a greater number of output images IMG2 than what would be possible without said processing. Alternatively or in addition, the size of the memory MEM3 and/or EXTMEM may be smaller than without said processing. Also a lower data transmission rate may be used.

Figure 2:
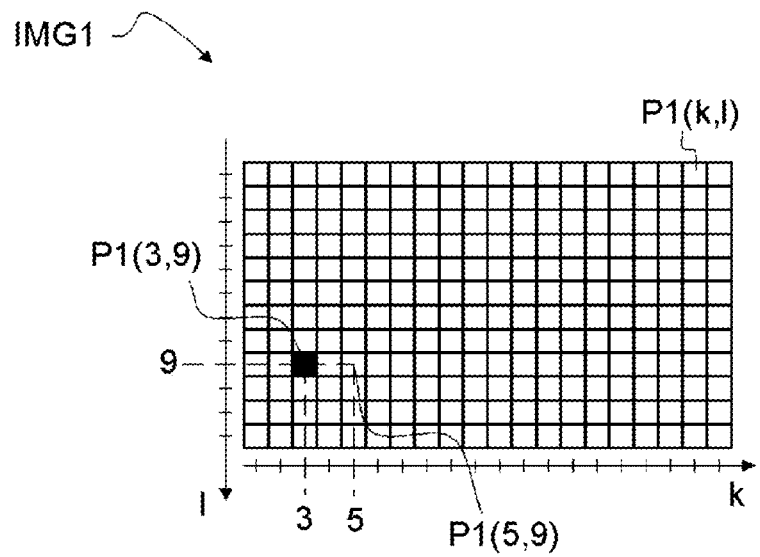
FIG. 2 shows an image captured by a binary image sensor.

Referring to FIG. 2, the image sensor 100 may be a binary image sensor arranged to provide a binary image IMG1. The image sensor 100 may comprise a two-dimensional array of light detectors such that the output of each light detector has only two logical states. Said logical states are herein called as the "black" state and the "white" state. The image sensor may be initialized such that all detectors may be initially at the black state. An individual detector may be switched into the white state by exposing it to light. Thus, a binary image IMG1 provided by the image sensor 100 may consist of pixels P1, which are either in the black state or in the white state, respectively. The expressions "white pixel" and "the pixel is white" refer to a pixel which is in the white state. The expression "black pixel" refers to a pixel which is in the black state, respectively.

The pixels P1 may be arranged in rows and columns, i.e. the position of each pixel P1 of an input image IMG1 may be defined by an index k of the respective column and the index l of the respective row. For example, the pixel P1(3,9) shown in FIG. 2 is black and the pixel P1(5,9) is white.

A binary light detector may be implemented e.g. by providing a conventional (proportional) light detector which has a very high conversion gain (low capacitance). Other possible approaches include using avalanche or impact ionization to provide in-pixel gain, or the use of quantum dots.

Figure 3:
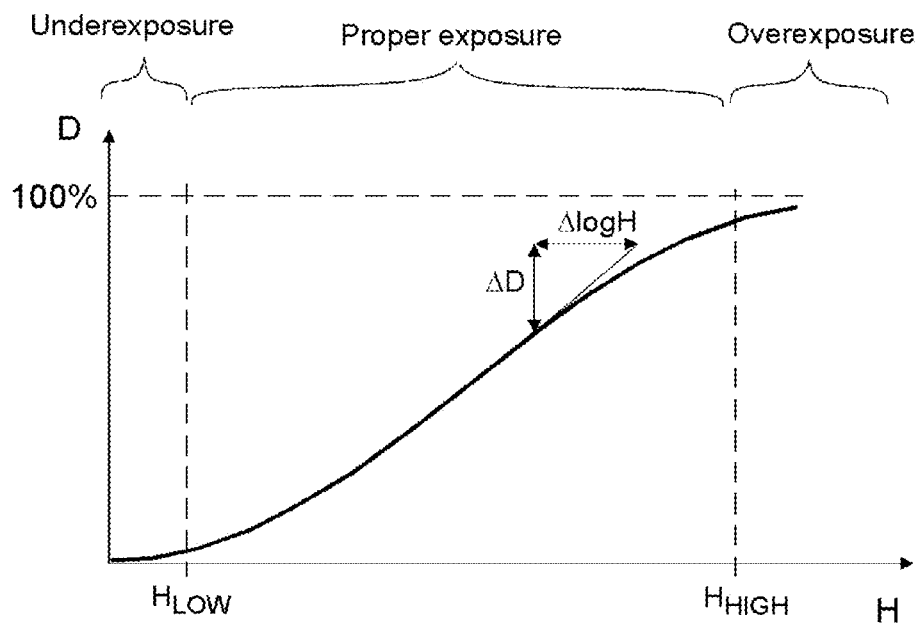
FIG. 3 shows the density of white pixels in a binary image as a function of optical exposure.

FIG. 3 shows an estimate for the density D of white pixels P1 as a function of optical exposure H. The exposure H is presented in a logarithmic scale. The density D means the ratio of the number of white pixels P1 within a portion of the image IMG1 to the total number of pixels P1 within said portion. A density value 100% means that all pixels within the portion are in the white state. A density value 0% means that all pixels within the portion are in the black state. The optical exposure H is proportional to the optical intensity and the exposure time. The density D is 0% at zero exposure H. The density increases with increasing exposure until the density begins to saturate near the upper limit 100%.

The conversion of a predetermined pixel P1 from black to white is a stochastic phenomenon. The actual density of white pixels P1 within the portion of the image IMG1 follows the curve of FIG. 3 when said portion contains a high number of pixels P1.

In case of individual pixels, the curve of FIG. 3 may also be interpreted to represent the probability for a situation where the state of a predetermined pixel P1 is converted from the black state to the white state after a predetermined optical exposure H.

An input image IMG1 is properly exposed when the slope $\Delta D/\Delta \log(H)$ of the exposure curve is sufficiently high (greater than or equal to a predetermined value). Typically, this condition is attained when the exposure H is greater than or equal to a first predetermined limit $H_{LOW}$ and smaller than or equal to a second predetermined limit $H_{HIGH}$. Consequently, the input image may be underexposed when the exposure H is smaller than the first predetermined limit $H_{LOW}$, and the input image may be overexposed when the exposure H is greater than the second predetermined limit $H_{HIGH}$.

The signal-to-noise ratio of the input image IMG1 or the signal-to-noise ratio of a smaller portion of the input image IMG1 may be unacceptably low when the exposure H is smaller than the first limit $H_{LOW}$ or greater than the second limit $H_{HIGH}$. In those cases it may be acceptable to reduce the effective spatial resolution in order to increase the signal-to-noise ratio.

The exposure state of a portion of the input image IMG1 may be estimated e.g. based on the density of white pixels P1 within said portion. The density of white pixels in a portion of an image depends on the density of black pixels within said portion.

Figure 4A:
FIG. 4a shows, by way of example, an image of a girl.
Figure 4B:
FIG. 4b shows a binary image corresponding to the image of FIG. 4a, FIG. 5 shows encoding an input image into a set of parameter arrays, and subsequent decoding of said parameter arrays into an output image.

FIG. 4a shows, by way of example, an image of a girl. FIG. 4b shows a binary image corresponding to the image of FIG. 4a. The image of FIG. 4b has a large pixel size in order to emphasize the black and white pixel structure.

Figure 5:
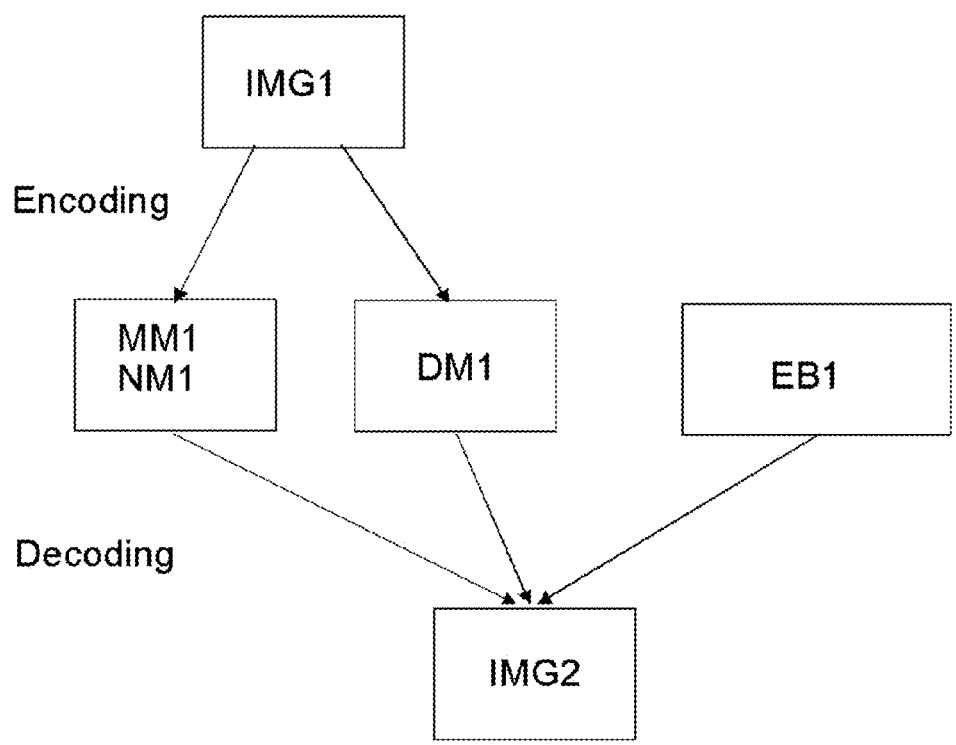

Referring to FIG. 5, a binary input image IMG1 may be encoded into a set of parameter arrays in order to facilitate transferring of image data, and/or in order to reduce the size of memory space needed for storing image data. The set of parameter arrays may comprise e.g. three arrays DM1, MM1, NM1.

The parameter arrays DM1, MM1, NM1 may be subsequently decoded into a corresponding output image IMG2 by using elements of an image element array EB1.

Figure 6:
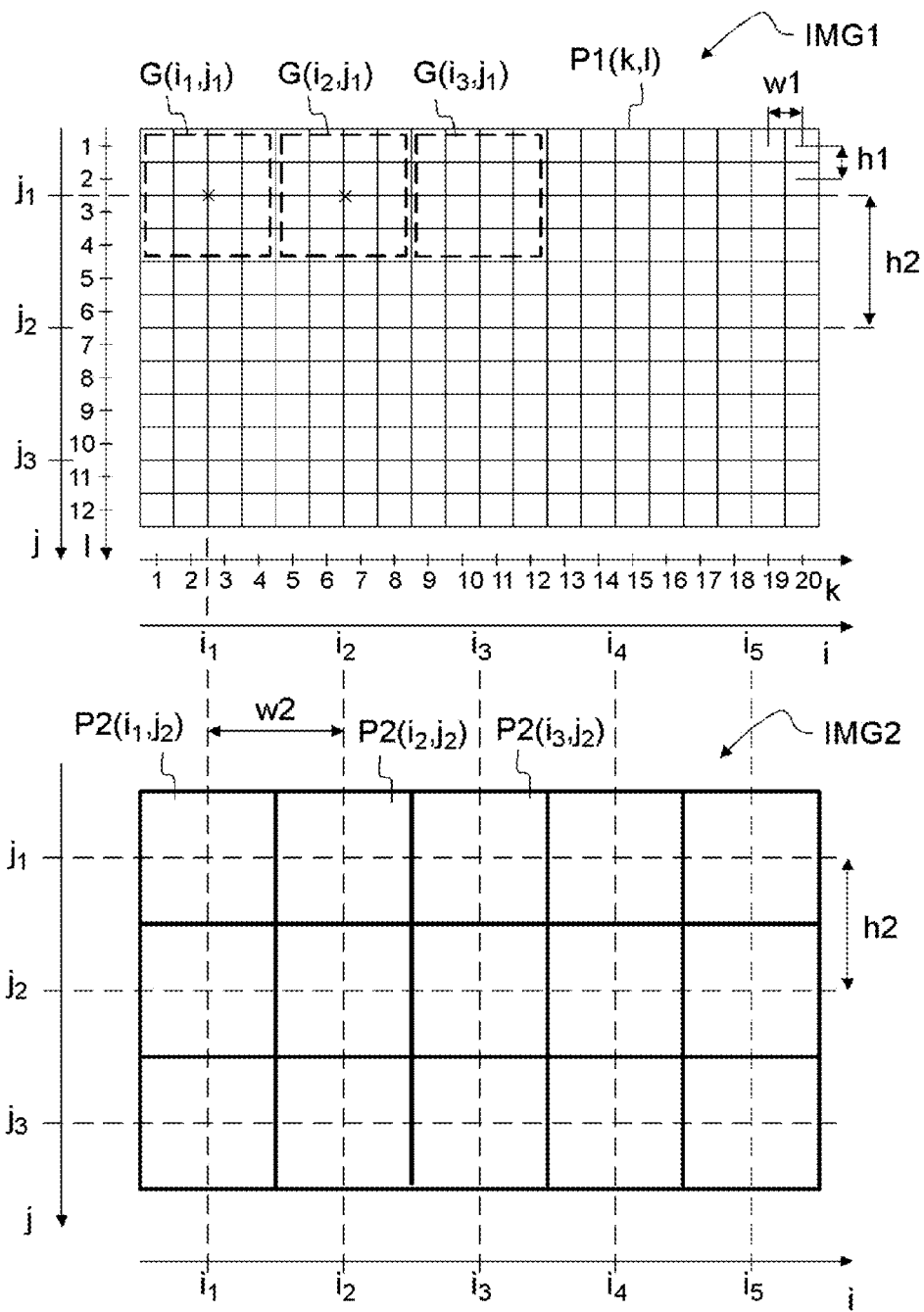
FIG. 6 shows positions of the image portions of an output image with respect to the positions of the pixels of an input image.

FIG. 6 shows a binary input image IMG1 and a corresponding output image IMG2. The input image IMG1 comprises binary input pixels P1, whose positions may be defined by coordinates k,l. The input image IMG1 may be divided into a plurality of input pixel groups G. The position of each input pixel group G may be defined by coordinates i,j.

Each input pixel group G may comprise adjacent input pixels P1 arranged e.g. in a 4×4 formation, i.e. each input pixel group G may comprise 16 pixels P1 arranged in 4 rows and 4 columns. Alternatively, each input pixel group G may comprise pixels arranged e.g. in 8×8, 16×16, or 32×32 formation. Each input pixel group G may preferably comprise more than 15 pixels P1.

A set of parameters may be determined based on each input pixel group G. The parameters of all input pixel groups G may constitute a parameter array DM1 ("density matrix"), a parameter MM1 ("m-matrix"), and a parameter array NM1 ("n-matrix"). The set of parameter arrays DM1, MM1, NM1 may be subsequently decoded so as to form an output image IMG2.

The output image IMG2 comprises a plurality of output image portions P2, wherein each portion P2 located at the coordinates i,j may be provided based on the parameters of an input pixel group G having said coordinates i,j.

w1 denotes a horizontal distance between the centers of adjacent input pixels P1. h1 denotes a vertical distance between the centers of adjacent input pixels P1. w2 denotes a horizontal distance between the centers of adjacent output image portions P2. h2 denotes a vertical distance between the centers of adjacent output image portions P2.

Figure 7A:
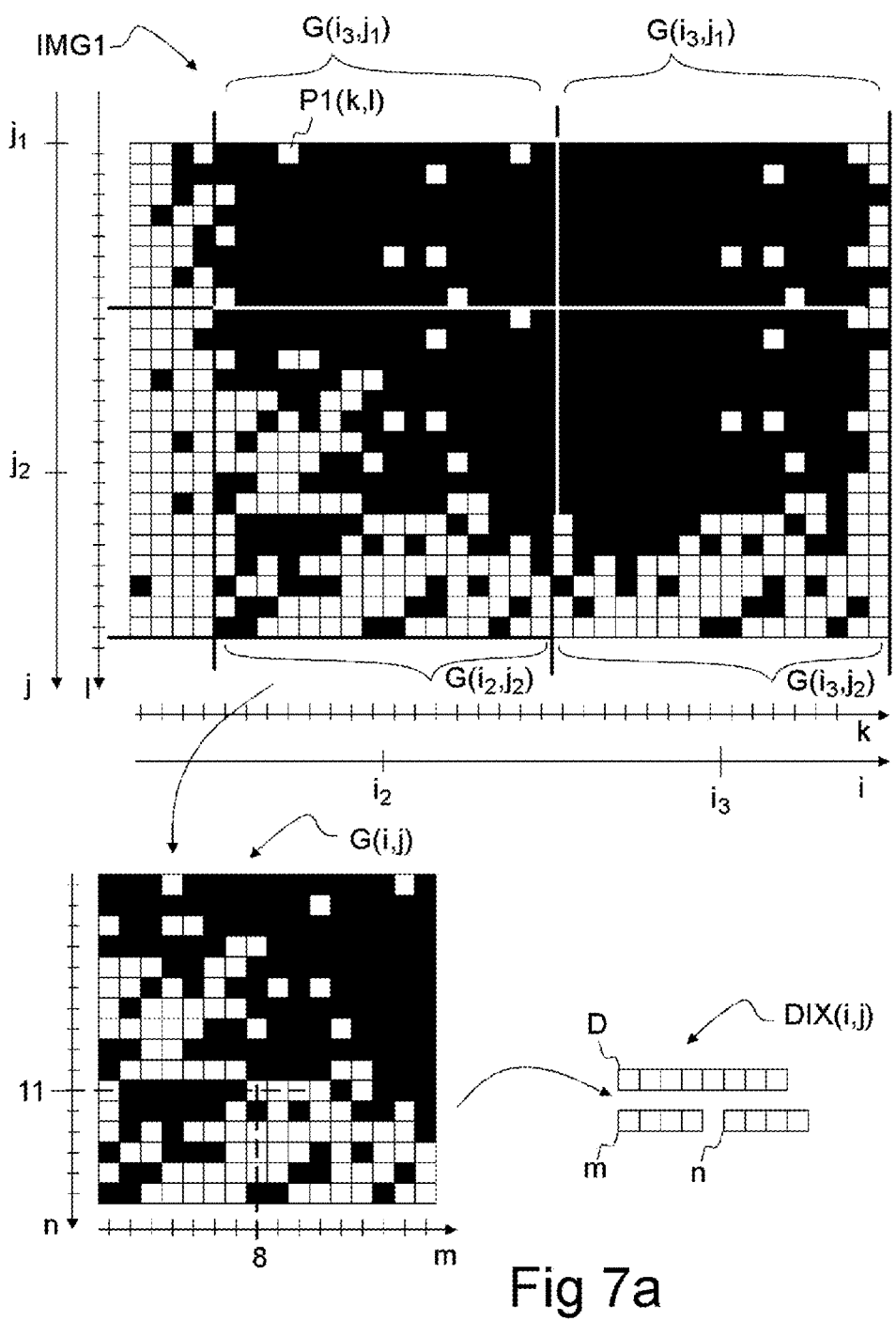
FIG. 7a shows determining the density of white pixels within a pixel group, and determining the distribution of white pixels in said pixel group.

Referring to FIG. 7a, a binary input image IMG1 may be divided into a plurality of input pixel groups G located at coordinates i,j. An input pixel group G may comprise e.g. 256 input pixels P1 arranged as a 16×16 array. The location of each input pixel P1 within an input pixel group G may be defined by a horizontal coordinate m and a vertical coordinate n.

Parameters D(i,j), m(i,j), and n(i,j) may be determined based on each input pixel group G1. In particular, a first set of parameters $D(i_2,j_2)$, $m(i_2,j_2)$, and $n(i_2,j_2)$ may be determined based on a first group $G(i_2,j_2)$ of pixels P1, and a second set of parameters $D(i_3,j_2)$, $m(i_3,j_2)$, and $n(i_3,j_2)$ may be determined based on a second group $G(i_3,j_2)$ of pixels P1

The density parameter D(i,j) may be e.g. equal to the number of white input pixels P1 within an input pixel group located at the coordinates i,j. The first distribution parameter m(i,j) may e.g. indicate the horizontal coordinate of the center of gravity of white input pixels P1 within the input pixel group located at the coordinates i,j. The second distribution parameter n(m,n) may e.g. indicate the horizontal coordinate of the center of gravity of white input pixels P1 within the input pixel group located at the coordinates i,j. In other words, the coordinates m,n indicate the average location of white pixels within the group G.

The number of parameter arrays depends on the selected encoding method. Thus, an input image IMG1 may be encoded to form one, two, or three parameter arrays, or to form four or more parameter arrays. Image information contained in the arrays may also be represented in the memory in some other form than as conventional arrays. For example, multiple arrays may alternatively be represented by a single array with structured elements. The image data may also be in another data structure than an array. In general, the image data may be represented by a set of parameters.

It is also possible to store said set of parameters e.g. by using some compression method.

Also several other types of parameter arrays may be determined instead of the parameter arrays DM1, MM1, and/or NM1 or in addition to the parameter arrays DM1, MM1, and/or NM1. For example, a parameter array may be determined which contains information about the difference between the number of white pixels in a first input pixel group and the number of white pixels in a second input pixel group.

In case of FIG. 7a, the input pixel group G located at coordinates $i_1,j_2$ has 99 white pixels, and the center of gravity of the white pixels within said group is located at the intersection of the 11th row and the 8th column. Thus, the parameters values may be e.g. as follows: $D(i_1,j_2)=99$, $m(i_1,j_2)=8$, $n(i_1,j_2)=11$.

A group DIX(i,j) of parameters D(i,j), m(i,j), and (n(i,j) associated with the location (i,j) may be called as a "dixel".

If the input pixel group G comprises 256 pixels P1, the number of white pixels within said group may be expressed by using a word which has 8 bits. The m-coordinate may be expressed by using 4 bits, and the n-coordinate may also be expressed by using 4 bits. The respective dixel DIX(i,j) comprises 16 bits (=8+4+4). Consequently, the dixel DIX(i,j) may occupy only 6% of the memory space needed to store the original input pixel group G(i,j).

More precisely, the number of white pixels within said input pixel group G may range from 0 to 256. With 8 bits, it is possible to cover only the range from 0 to 255 (or the range from 1 to 256). However, for practical purposes the pixel number 256 may be truncated to the value 255. If desired, also 9 bits may be used to define the density parameter D.

Figure 7B:
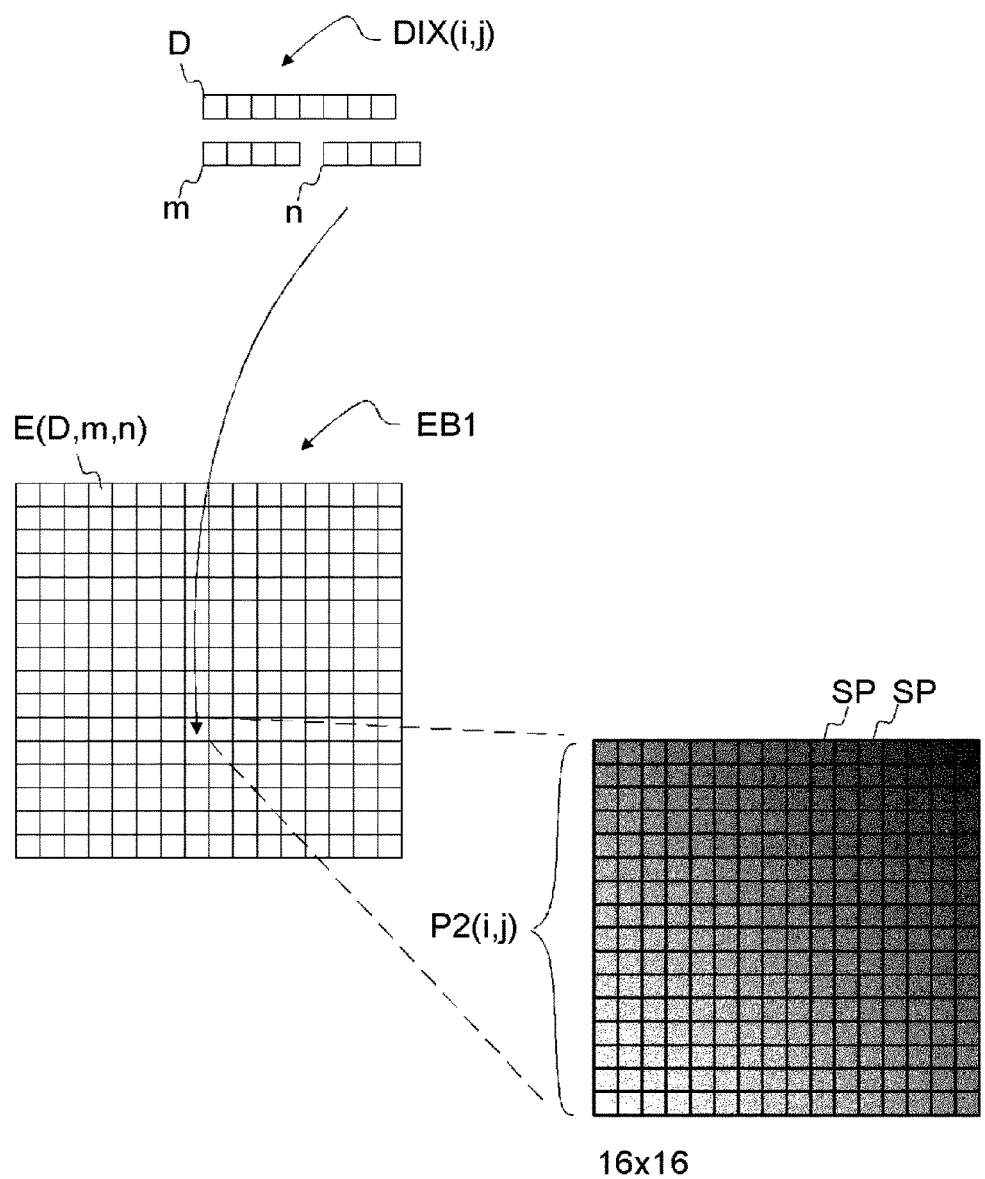
FIG. 7b shows determining an image element based on density information, based on distribution information, and based on a desired output resolution (in decoding)

Referring to FIG. 7b, an image element E(D,m,n) may be selected from an image element array EB1 based on the values of the parameters D,m, and n of a dixel DIX(i,j). Alternatively, the image element E(D,m,n) may be calculated on the fly. An image element E(D,m,n) may be generated e.g. by bi-linear interpolation or by calculating values of a paraboloid surface (non-linear interpolation).

An image element E(D,m,n) corresponding to a dixel DIX (i,j) may be used as a portion P2(i,j) of the output image IMG2 at the location (i,j).

The image elements E(D,m,n) and the output image portions P2(i,j) may comprise one or more shades of grey. The image elements E(D,m,n) and the output image portions P2(i, j) do not need to be spatially uniform. However, if desired, the image elements E(D,m,n) and the corresponding output image portions P2(i,j) may be divided into several spatially uniform sub-pixels SP in order to provide a higher resolution for the output image IMG2, wherein at least one image element (E) may comprise a first sub-pixel (SP) representing a first shade, and a second sub-pixel representing a second shade, wherein the first shade is different from the second shade.

Figure 7C:
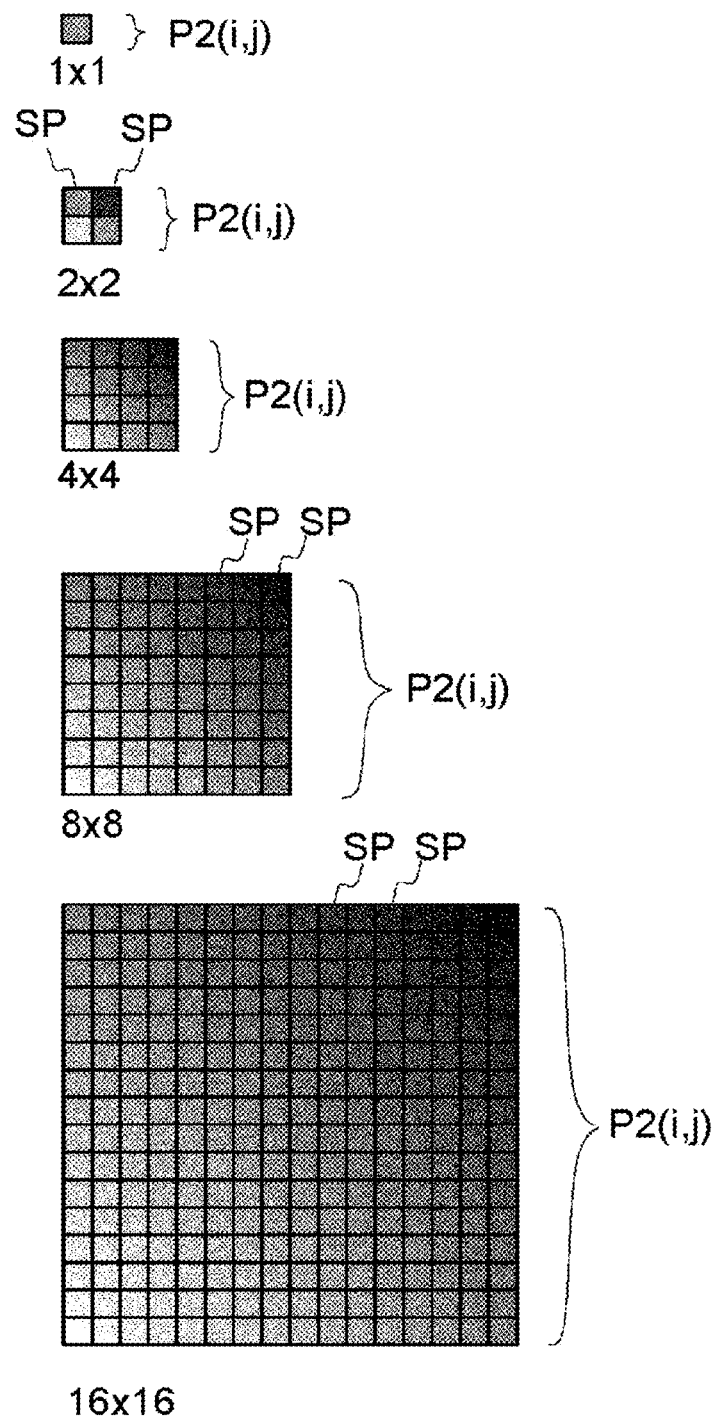
FIG. 7c shows image elements having different resolutions.

Referring to FIG. 7c, an image portion P2(i,j) may be divided e.g. into 1, 4, 64, or 256 sub-pixels SP. The sub-pixels SP may be arranged e.g. in a 1×1, 2×2, 4×4, 8×8, or 16×16 formation.

Figure 7D:
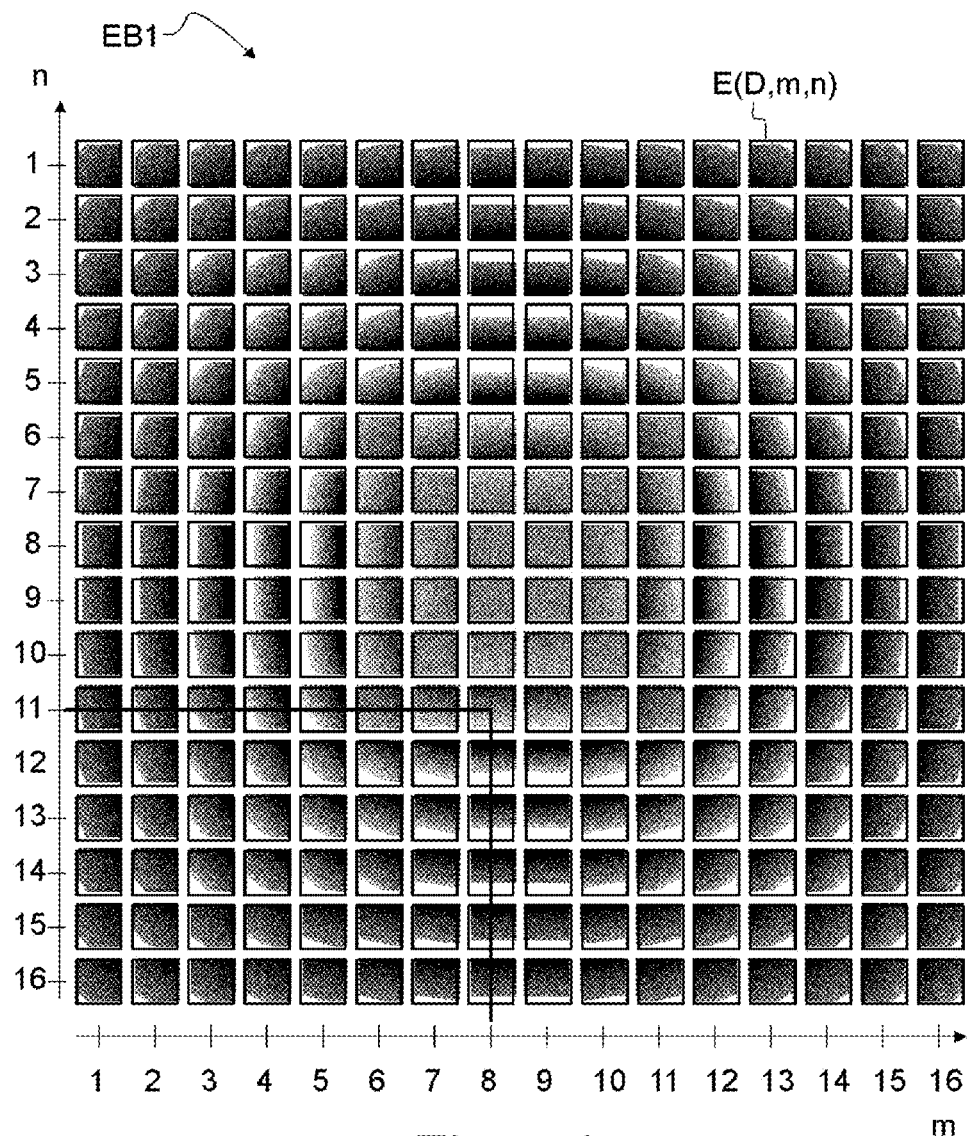
FIG. 7d shows an image element array for decoding.

FIG. 7d shows an image element array EB1. The image element array EB1 is actually a three-dimensional array, because the element values E(D,m,n) may be selected based on three different parameters, i.e. based on the density parameter D, on the first distribution parameter m, and on the second distribution parameter n.

It is also possible to use a two-dimensional array, and the variations in the third dimension may be calculated on-the-fly e.g. by using the density parameter D as a base value for the brightness.

It may noticed that only a very limited number of combinations of the entry parameters D,m,n are possible near the corners of the image element array EB1. For example, the combination m=1 and n=16 means that there is only one white pixel located at the corner of the image element array EB1, and the density parameter D must be equal to one. This implies that the data of the dixels DIX(i,j) may be further compressed by using suitable data compression or coding technique, if desired. For example, the original 16 bits contained in a dixel DIX(i,j) may be represented e.g. by using 10 bits only.

Figure 7E:
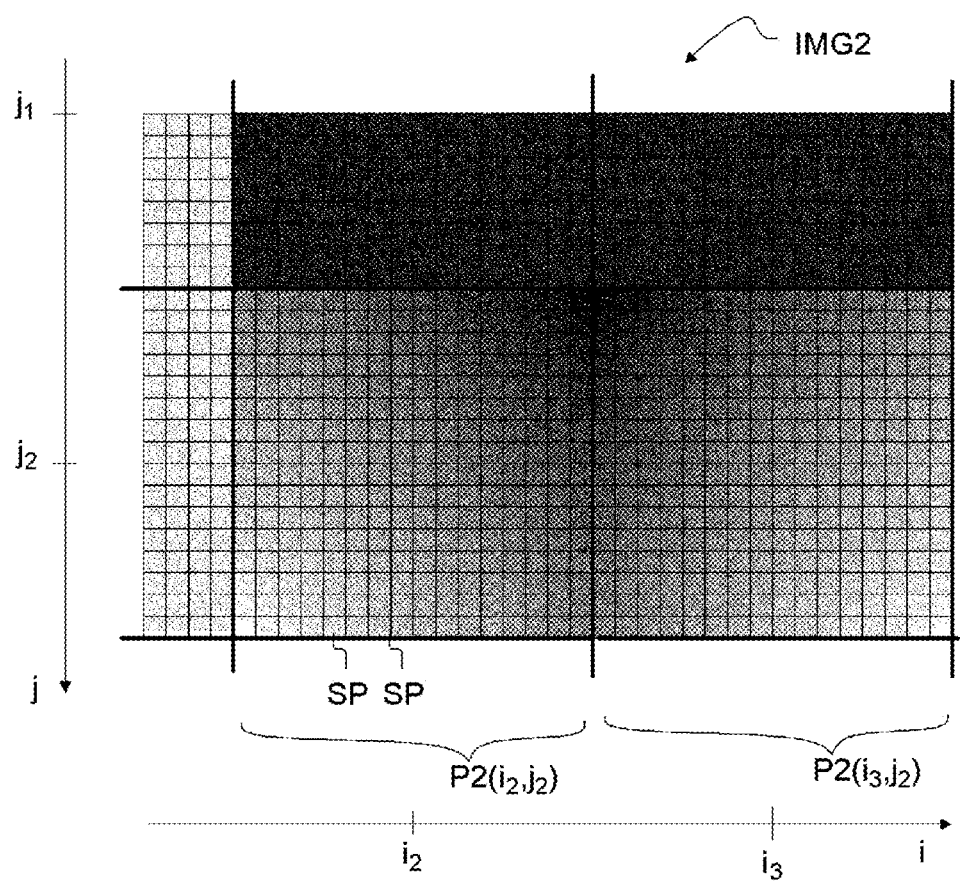
FIG. 7e shows an enlarged portion of an output image corresponding to the input image shown in FIG. 7a, FIG. 8 shows method steps for processing an image.

Referring to FIG. 7e, an output image portion P2(i,j) corresponding to the dixel DIX(i,j) may be used to represent the original input pixel group G(i,j) shown at the respective location (i,j).

For example, a first output image portion P2($i_2,j_2$) may represent an input pixel group G($i_2,j_2$). A second output image portion P2($i_3,j_2$) may represent an input pixel group G($i_3,j_2$).

If desired, each portion P2(i,j) may be further divided into a plurality of spatially uniform sub-pixels SP (see FIG. 7b).

Figure 8:
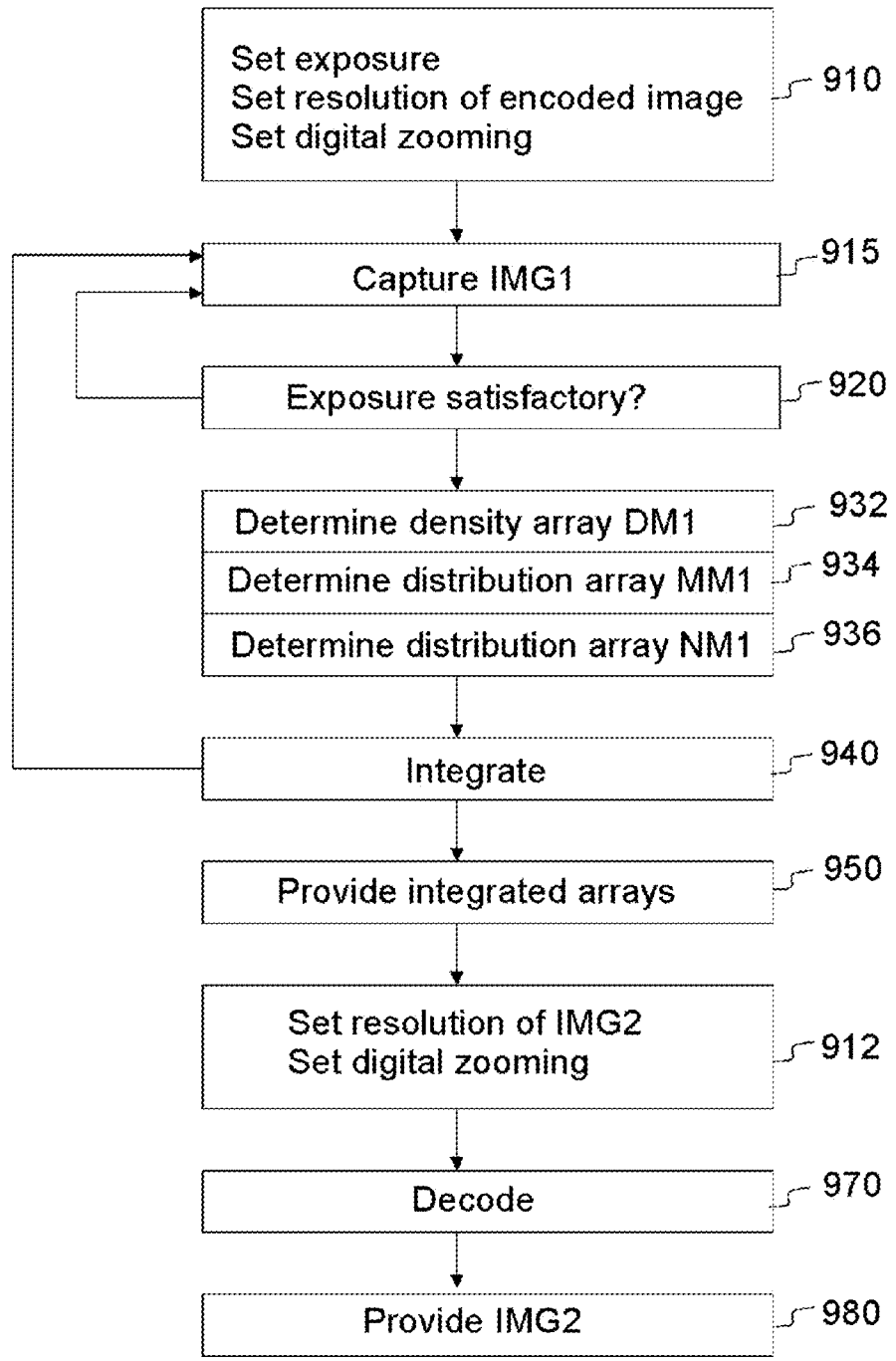

FIG. 8 shows method steps for encoding and decoding.

In step 910, a user may select a desired exposure time, exposure mode, resolution of the encoded image, and/or digital zooming (cropping).

In step 915, a binary input image IMG1 may be captured by the image sensor 100.

The exposure level may be checked in step 920. For example, if more than 90% of all input pixels P1 are black, the control unit 220 may be arranged to increase the exposure H, provided that the exposure time can be kept within limits set by the user. If more than 90% of all input pixels P1 are white, the control unit 220 may be arranged to decrease the exposure H.

The optical exposure H may be adjusted e.g. by changing exposure time and/or optical aperture of the imaging optics 10.

The parameter arrays DM1, MM1, and NM1 may be determined in steps 932, 934, 936, respectively.

A digital zoom value selected by the user may be utilized in steps 915, 920, 932, 934, and/or 936. Pixels in the peripheral image area may be omitted during the processing if they are outside the image area selected by the user.

If the user has selected an "averaging" mode, the parameters of several subsequent input images IMG1 may be determined. The parameters of several subsequent input images IMG1 may be averaged or integrated in step 940. Parameter arrays comprising the averaged or integrated parameters, e.g. the parameters D,m,n may be e.g. stored in a memory or transmitted in step 950.

For example, the density parameters D of a particular input pixel group G in eight consecutive input images IMG1 may be averaged in order to improve signal-to-noise ratio. The coordinate in for said particular input pixel group G in eight consecutive input images IMG1 may be averaged, respectively. The coordinate n for said particular input pixel group G in eight consecutive input images IMG1 may be averaged, respectively.

When the user wishes e.g. to view a reproduced image IMG2 corresponding to the input image IMG2, he may select the desired output resolution of the output image IMG2 and/ or he may set a digital zoom value again in step 912.

Image elements E(D,m,n) may be determined based on the DIX(i,j) in the decoding step 970.

The generated output image IMG2 may be e.g. stored, transmitted or displayed in step 980.

Figure 9A:
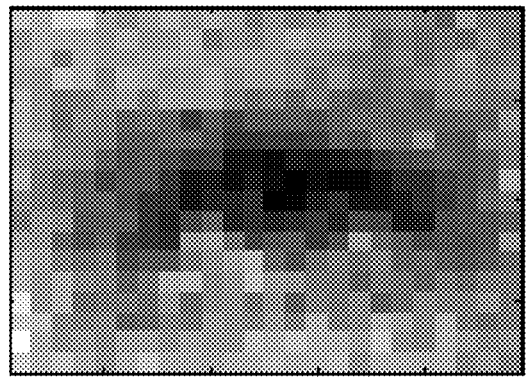
FIG. 9a shows an output image composed of uniform image elements determined based on density information.

FIG. 9a shows, by way of example, an image of an eye, wherein said image consists of spatially uniform pixels.

Figure 9B:
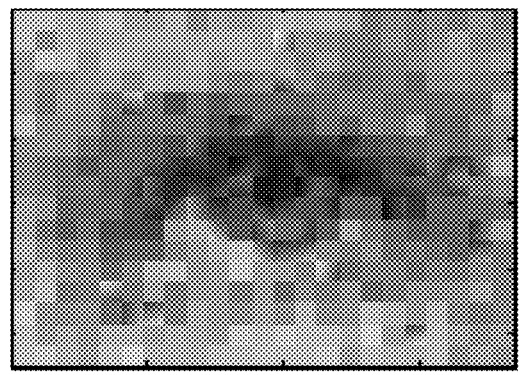
FIG. 9b shows an output image composed of image elements, wherein said image elements have been selected from an image element array based on density information and based on distribution information.

FIG. 9b shows an image of the eye, wherein said image consists of image portions P2, which have been determined based on dixels DIX.

Image elements E selected from the image element array EB1 are used as the image portions P2. Thus, the output image of FIG. 9b may also be interpreted to consist of the image elements E.

Figure 9C:
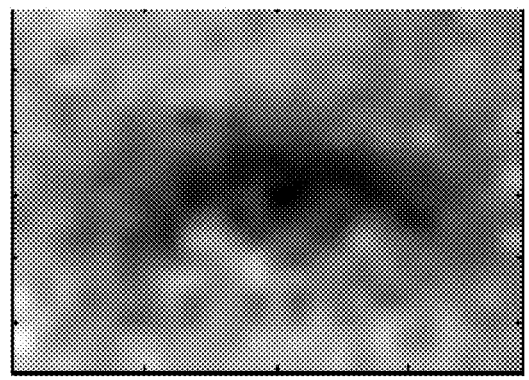
FIG. 9c shows an output image provided by interpolating density information.

FIG. 9c shows an image of the eye, wherein said image has been provided by interpolating gray scale values of FIG. 9a.

It may be noticed that certain visual features, e.g. the pupil is reproduced more clearly in FIG. 9b, when compared with FIGS. 9a and 9c.

Yet, in a more sophisticated approach, the image elements E may be determined based on the parameters D,m,n associated with a particular input pixel group G(i,j) and based on the parameters D,m,n of each neighbouring input pixel group G(i,j−1), G(i,j+1), G(i−1,j), G(i+1,j). Thus, an image element E applied at the location (i,j) may be determined based on e.g. 15 different parameters. This might remove a possible discontinuity in the gray levels between adjacent output image portions P2.

The possible discontinuity may also be removed by linear or non-linear interpolation between adjacent output image portions P2.

The input image IMG1 may processed such that the input pixel groups G are larger in a first portion of the input image IMG1 than in a second portion of the input image IMG2. For example, regions of the input image IMG1 which are underexposed or overexposed may be processed by using larger input pixel groups G than image regions which are properly exposed. In that case a further parameter array may be stored and/or transferred, i.e. a parameter array comprising information about the size of each input pixel group G. Thus, the size of each corresponding output image portion P2 may be set when the output image is reproduced by the decoder 300. Each dixel DIX(i,j) may comprise information about the size and/or form of the corresponding input pixel group G(i,j).

The device 500 may also be implemented without the imaging optics 10 and the image sensor 100. In that case the device 500 may be arranged to process input images IMG1 previously captured and stored in the input memory MEM1.

The device 500 may further comprise e.g. a data processing unit, memory and communications unit to provide access to a mobile telephone network, internet or local area network. The device 500 may be or may be a part of a device selected from the following list: an imaging module connectable to a further device, portable device, device with wireless telecommunicating capabilities, imaging device, mobile phone, gaming device, music recording/playing device (based on e.g. MP3-format), measuring instrument, target finding device, aiming device, navigation device, personal digital assistant (PDA), communicator, portable internet appliance, hand-held computer, accessory to a mobile phone.

The device 500 may be arranged to process data of an input image IMG1, which is e.g. graphics or text.

The size of the individual light detectors of a binary image sensor may be smaller than the minimum size of a focal spot which can be provided by the imaging optics 10 of a digital camera. The use of an image sensor 100 which has so small detectors may help to avoid e.g. color aliasing problems due to color filter arrays.

The size of the individual light detectors of a binary image sensor 100 may even be smaller than the minimum size of a diffraction spot of the imaging optics 10. For example, the smallest focal spot might cover more than 40 detectors. Thus, the diameter of the smallest focal spot may correspond to a width, which is greater than the combined width of 7 adjacent pixels of a binary input image IMG1. Consequently, image noise may be reduced to some degree by spatial averaging without losing significant details of a captured image.

The size of the input pixel groups G(i,j) may be selected to be substantially equal to the size of the focal spot. Thus, the size of the parameter arrays DM1, MM1, NM1 may be minimized while still preserving the relevant visual features of the input image IMG1.

An advantage associated with the use of a binary image sensor 100 is also that a considerable number of defective light detectors may be tolerated without significantly degrading the quality of the output image IMG2. The locations of the defective light detectors of an image sensor 100 may be determined e.g. by a calibration measurement at the factory, and the effect of the defective light detectors may be compensated e.g. by multiplying the values of the elements of the filter arrays FA1 with corresponding correction coefficients, wherein each element of a particular filter array FA1 is multiplied by the same predetermined coefficient. The correction coefficients may be arranged e.g. as a correction array.

Thus, the values of the elements of the filter arrays FA1 may be adjusted such that an output image IMG2 having a substantially uniform brightness may be provided in a situation where an image of a substantially uniform surface is captured by an image sensor 100, which has defective light detectors. The relative fraction of defective detectors may be e.g. up to 10% without significantly degrading the quality of the output image, provided that the defective detectors are substantially evenly distributed among operating detectors.

The pixel groups G(i,j) do not need to be rectangular. For example, hexagonal or triangular pixel groups may be used.

The pixel groups G(i,j) do not need to be evenly distributed and/or they do not need to be of equal size. The output image portions P2(i,j) do not need to be evenly distributed and/or they do not need to be of equal size, respectively. However, in that case the parameter arrays should also comprise information about the size of the pixel groups G(i,j) and/or about the location of the pixel groups G(i,j).

For example, the pixel groups G(i,j) may be more densely spaced in those regions of an input image IMG1 which comprise visual edges. The distances between adjacent pixel groups G(i,j) may be greater in those regions of an input image IMG1 which are substantially uniform.

Color images may be provided e.g. by using optical color filters. The filters may provide e.g. red (R), green (G) and blue (B) color. The imaging device 500 may comprise e.g. three image sensors 100 to capture images of different colors, wherein light impinging on each sensor 100 may be filtered by a filter having a different color. Images provided by the different image sensors may be subsequently combined so as to form a color image.

Alternatively, a color filter array may be superposed on a single image sensor. Thus, different pixel groups of an image captured by the sensor may represent different colors. The pixel groups of different colors may be separated from each other so as to form a set of input images. The input images may be processed separately and the resulting output image may be combined so as to form a processed color image.

Figure 10:
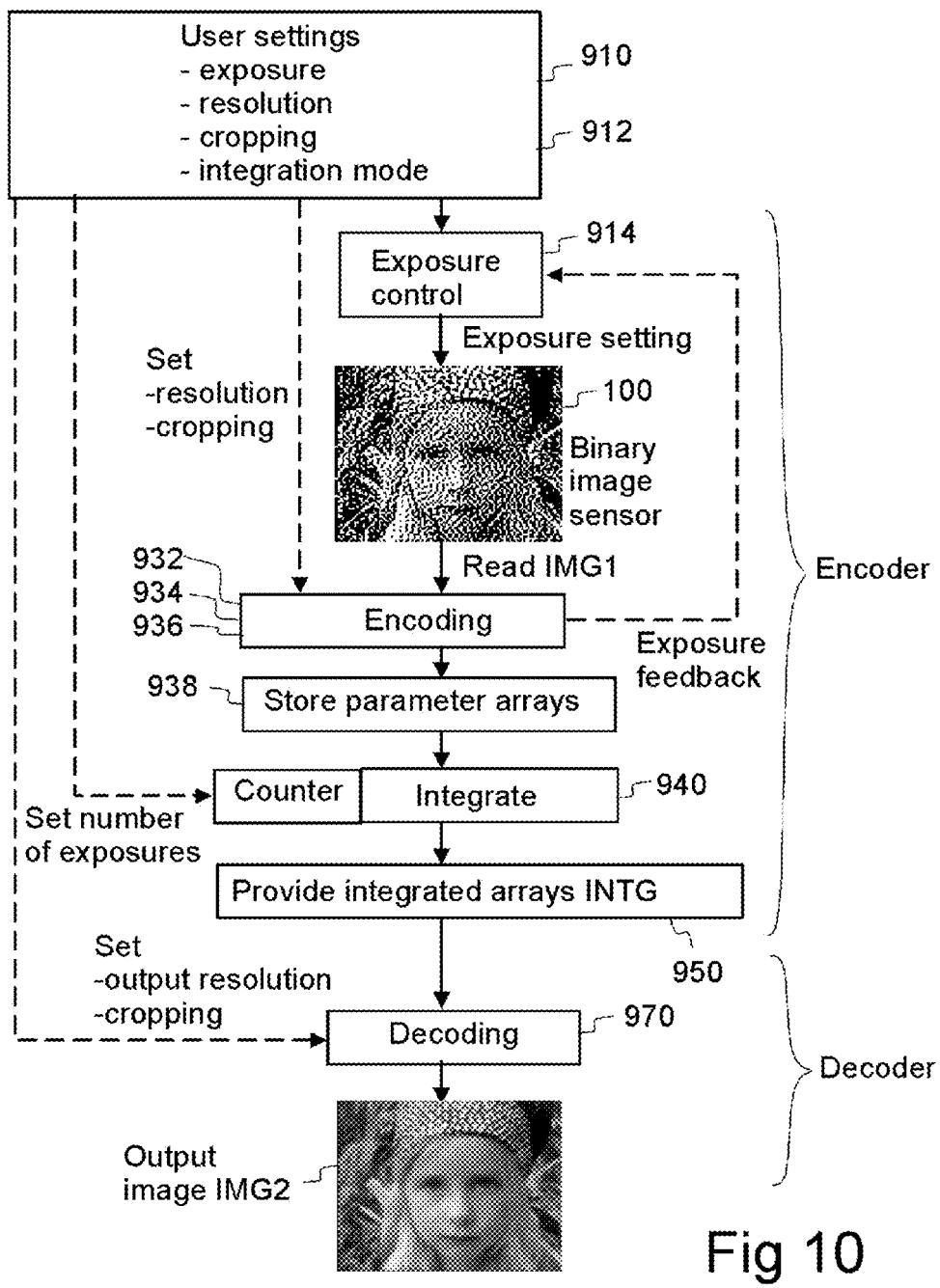
FIG. 10 shows method steps for image capturing, encoding, and decoding.

FIG. 10 shows method steps for image capturing, encoding, and decoding (see also FIG. 8). A device 500 may comprise means for executing the method steps shown in FIG. 10.

In step 910, the user may select imaging parameters such as preferred exposure mode (i.e. single image or integration of several images), encoding resolution, digital zooming (cropping), and/or maximum exposure time (long exposure time may lead to blurred images).

In step 914, the image sensor 100 and/or the imaging optics 10 may be configured according to the maximum allowed exposure time set by the user.

Based on the imaging parameters, the device 500 may be arranged to capture a first input image IMG1 when the device 500 is activated via the interface 240 (FIG. 1). The device 500 may comprise e.g. a push button arranged to start an image capturing procedure.

The captured input image IMG1 may be read from the image sensor 100 to the signal processor 200 (FIG. 1), which is arranged to "encode" the image in steps 932, 934, 936, i.e. to provide one or more parameter arrays DM1, NM1, MM1 based on the input image IMG1.

The data size may be reduced e.g. by a factor of 4 to 100 depending e.g. on the desired encoding resolution. The resulting set of parameter arrays DM1, NM1, MM1 may be stored in a memory in step 938, e.g. in the memory MEM2.

The parameter arrays DM1, MM1, NM1 may consume significantly less memory space and/or data transfer capacity than the original binary image IMG1.

The determined set of parameters, in particular the parameter arrays DM1, NM1, MM1 represent more detailed information than merely the average properties of the input image IMG1. Thus, the total data size of said set of parameter arrays may be e.g. greater than or equal to 100 times the data size of the binary input image (IMG1).

If the user has selected an integration mode, the parameter arrays of several consecutive input images may be integrated or averaged in step 940, until a set number of input images IMG1 have been processed. The integrated or averaged parameter arrays INTG may be provided in step 950. The integrated or averaged parameter arrays, i.e. the encoded image data may be stored in a memory (e.g. in the memory MEM3) or transferred via a transmission path (e.g. via internet).

Thus the imaging apparatus (500) may comprise a binary image sensor (100) arranged to capture a binary input image (IMG1), and a signal processing unit (200) arranged to provide a set of parameters (DM1, MM1, NM1) based on said binary input image (IMG1). The signal processing unit (200) may be arranged to provide a further set of parameters (INTG) by averaging a first parameter determined for a first input image (IMG1) and a second parameter determined for a second input image (IMG1). The apparatus (500) may further comprise a decoder (300) arranged to generate an output image (IMG2) by using said further set of parameters.

During multiple exposures, the signal processor 200 may be arranged adjust the exposure of an input image IMG1 based on a previous input image.

If the user has selected a single exposure more, the integrating step 940 may be omitted.

When averaging or integrating, the signal processor 200 may also be arranged to align the elements of the parameter arrays associated with consecutive input images IMG1 so as to compensate movement between the consecutive images IMG1. The elements may be aligned e.g. by adding time-dependent values to the indices i,j or by subtracting time-dependent values from the indices i,j.

The signal processor 200 may also be arranged to compensate estimated movement between consecutive images IMG1 by shifting the position of a read-out window with respect to the detectors of the image sensor 100 or by shifting a read-out window with respect to the pixels P1 of consecutive input images IMG1.

The signal processor 200 may also be arranged to calculate the number of consecutive exposures based on the detected illumination level and based on the maximum exposure time set by the user. For example, if the user has allowed a certain exposure time, e.g. 0.02 s, and if the signal processing unit 200 detects that proper optical exposure H may be obtained in 2 milliseconds, the device 500 may be arranged to average the parameters of ten (=0.02 s/0.002 s) consecutive input images (IMG1).

Subsequently, the decoder 300 may generate an output image IMG2 based on the parameter arrays DM1, NM1, MM1. The decoder 300 may set the resolution and/or cropping of the output image IMG2 based on user settings (step 912). The decoder 300 may determine image elements E(D, m,n) based on the parameter values D(i,j), m(i,j), n(i,j), and uses them as output image portions P2($i,j$) at corresponding positions (i,j) of the output image IMG2. At low resolution, each output image portion P2 may consist of e.g. 2×2 sub-pixels SP (See FIG. 7$c$). A high resolution, each output image portion P2 may consist of e.g. 16×16 sub-pixels (See FIG. 7$b$). The encoder makes it possible to achieve very high resolutions. However, due to memory limitations, only partial generation of the output image IMG2 may be possible at full resolution.

Parameter arrays of a single input image IMG1 may be stored in the same memory e.g. MEM2 as the integrated parameter arrays of multiple exposures, in order to save memory space.

The drawings are schematic. For the person skilled in the art, it will be clear that modifications and variations of the devices, methods and data structures according to the present invention are perceivable. The particular embodiments described above with reference to the accompanying drawings are illustrative only and not meant to limit the scope of the invention, which is defined by the appended claims.

The invention claimed is:

1. A method for processing image data, said method comprising determining a set of parameters based on a binary digital image such that said set of parameters comprises information about the density of white and/or black pixels of a first group of pixels of said binary digital image, and information about the density of white and/or black pixels of a second group of pixels of said binary digital image, the information for each of the first group and the second group representing binary image data as continuous tone imagery;
   wherein said set of parameters comprises information about the distribution of white and/or black pixels in said first group of pixels, and information about the distribution of white and/or black pixels in said second group of pixels; and
   wherein said set of parameters is arranged in one or more parameter arrays, and the elements of parameter arrays associated with consecutive input images are aligned so as to compensate movement between the consecutive images.

2. The method of claim 1 wherein data size of said binary input image is greater than or equal to 4 times the total data size of said set of parameters.

3. The method of claim 2 wherein data size of said binary input image is greater than or equal to 100 times the total data size of said set of parameters.

4. The method according to claim 1 further comprising capturing said binary digital image by a binary image sensor and imaging optics.

5. The method of claim 4 wherein individual detectors of said binary image sensor are smaller than a minimum focal spot of said imaging optics.

6. The method according to claim 4 wherein estimated movement between consecutive images is compensated by moving the position of a read-out window with respect to detectors of the image sensor.

7. The method according to claim 4 wherein an exposure time of said binary input image is set based on an optical exposure of a previously captured image.

8. The method according to claim 1 further comprising averaging parameters generated from two or more binary digital images.

9. The method according to claim 8 wherein the number of binary digital images used for said averaging is determined based on a detected optical exposure.

10. The method according to claim 1 wherein the distance between adjacent groups of pixels depends on the density of white or black input pixels within a portion of an image.

11. A non-transitory computer readable medium comprising program code, which when executed by a data processor is for determining a set of parameters based on a binary digital image such that said set of parameters comprises information about the density of white and/or black pixels of a first group of pixels of said binary digital image, and information about the density of white and/or black pixels of a second group of pixels of said binary digital image, the information for each of the first group and the second group representing binary image data as continuous tone imagery;

wherein said set of parameters comprises information about the distribution of white and/or black pixels in said first group of pixels, and information about the distribution of white and/or black pixels in said second group of pixels; and wherein said set of parameters is arranged in one or more parameter arrays, and the elements of parameter arrays associated with consecutive input images are aligned so as to compensate movement between the consecutive images.

12. A device comprising a signal processing unit arranged to determine a set of parameters based on a binary digital image such that said set of parameters comprise information about the density of white and/or black pixels of a first group of pixels of said binary digital image, and information about the density of white and/or black pixels of a second group of pixels of said binary digital image, the information for each of the first group and the second group representing binary image data as continuous tone imagery;

wherein said set of parameters comprises information about the distribution of white and/or black pixels in said first group of pixels, and information about the distribution of white and/or black pixels in said second group of pixels; and wherein said set of parameters is arranged in one or more parameter arrays, and the elements of parameter arrays associated with consecutive input images are aliened so as to compensate movement between the consecutive images.

13. The device of claim 12 further comprising a binary image sensor.

* * * * *

UNITED STATES PATENT AND TRADEMARK OFFICE
CERTIFICATE OF CORRECTION

| | | |
|---|---|---|
| PATENT NO. | : 8,615,132 B2 | |
| APPLICATION NO. | : 12/823065 | |
| DATED | : December 24, 2013 | |
| INVENTOR(S) | : Jarmo Antero Nikula et al. | |

It is certified that error appears in the above-identified patent and that said Letters Patent is hereby corrected as shown below:

IN THE CLAIMS:

In Claim 12: Column 14, line 24, delete "aliened" and replace with --aligned--.

Signed and Sealed this
Fifteenth Day of April, 2014

Michelle K. Lee
*Deputy Director of the United States Patent and Trademark Office*